UNITED STATES PATENT OFFICE.

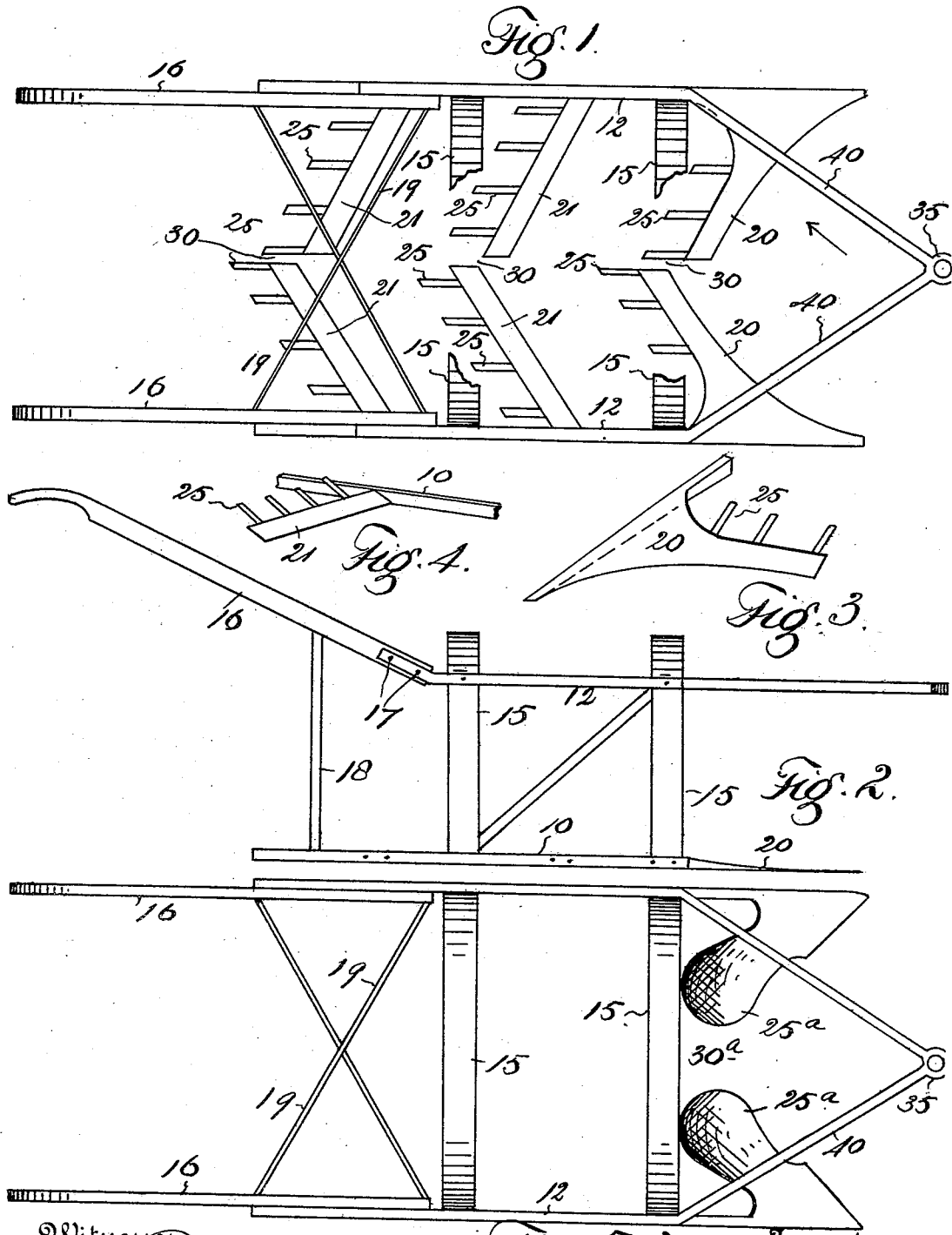

JEROME B. BLANCHARD, OF DENVER, COLORADO.

POTATO-DIGGER.

SPECIFICATION forming part of Letters Patent No. 508,201, dated November 7, 1893.

Application filed September 23, 1891. Serial No. 406,608. (No model.)

*To all whom it may concern:*

Be it known that I, JEROME B. BLANCHARD, a citizen of the United States of America, residing at Denver, in the county of Arapahoe and State of Colorado, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved agricultural implement, more especially designed for use as a potato digger, but which may be employed as a cultivator or weed exterminator or for other similar purposes.

The device consists of a suitable frame to which are attached one or more pairs, preferably several pairs, of metallic wings or shares, the different pairs or sets being arranged, one in front of the other. The shares of each pair are secured to the framework on the outside and extend inwardly toward the center. A space is left between these inner or free extremities of each pair of wings to allow weeds, vines or other material to pass through without clogging the machine. The rear edges of the shares are provided with teeth projecting backward therefrom. The shares or wings are so shaped and arranged as to first loosen the vegetables from the earth and then carry them toward the longitudinal center of the machine and at the same time toward the top of the ground. To accomplish this object as many sets or pairs of shares may be used as may be found necessary to attain the object sought.

The invention will be fully understood by reference to the accompanying drawings in which is illustrated an embodiment thereof.

In the drawings, Figure 1 is a top or plan view of the machine. Fig. 2 is a side elevation of the framework. Figs. 3 and 4 are perspective views of the two different styles of shares used. Fig. 5 is a top or plan view of a modified form of the device which may be used in "hilling up" the potatoes or forming a ridge with the sides sloping downward from the center of the row.

In the views let the numeral 10 designate two longitudinal bottom bars and 12 two similar top bars, these two sets of bars being connected by the bow-shaped braces 15. The handles 16 are secured to the top bars in any suitable manner as by bolts or rivets as shown at 17, Fig. 2, and are connected with the bottom bars by rods or supports 18. The handles are also connected with each other and braced by rods 19. To the lower or bottom bars are secured the shares 20 and 21, the construction of which is best illustrated in Figs. 3 and 4 respectively. The forward shares 20 are shaped to some extent like the share of an ordinary plow with the mold board removed, the two shares being so set that both throw the potatoes inward toward the center of the machine. The shape of all the shares in the rear of the shares 20 is best illustrated in Fig. 4. The rear edge of both sets of shares is more elevated than the forward or cutting edge, this rear edge being provided with teeth 25 inclined upward and adapted to separate the potatoes from the dirt.

If desired, the different sets of shares may be located at different elevations, the forward shares occupying the lowest plane, and the set immediately in the rear a higher plane and so on to the rearmost set, so that the function of each set of shares is to raise the potatoes nearer the top than the preceding set, a sufficient number of sets being used to make the work complete. The space or opening 30 between the free extremities of each set of shares gives a free passage way to material which otherwise might clog the machine.

In the style of machine shown in Fig. 5 only the two forward shares 25ª are employed and these are so shaped as to throw the dirt inward and form a ridge between the inner or free extremities of the shares, and is specially designed for use in the work of "hilling" potatoes or other vegetables. It will be observed that the inner extremities of the shares 25ª are more remote from each other than the corresponding extremities of the shares 25 shown in Fig. 1. The object of this, will be apparent when it is understood that in the use of the machine shown in Fig. 5, one share 25ª passes on each side of the row which lies in the open space 30ª between the inner extremities of the shares.

The form of machine shown in Fig. 1 may be employed not only in digging potatoes, but also in digging other vegetables as turnips, beets, carrots, &c., since the object is the same in all cases, namely to separate the vegetables from the earth and bring them to the top of the ground.

When the machine is used as a cultivator or weed exterminator, it digs the weeds and carries them to the top of the ground placing them in the center between the two rows.

When used as a digger the team is hitched to the eye 35 formed at the junction of the draw bars 40 which are attached to or form a continuation of the longitudinal top bars 12, of the machine. The team, consisting of two horses, is made to straddle the row.

Having thus described my invention, what I claim is—

1. In a potato digger, the combination of a frame composed of two longitudinal bottom bars 10, two similar top bars 12, the bow-shaped braces 15 connecting these two sets of bars, and the handle 16 secured to the top bars and supported by the braces 18 projecting upward from the bottom bar, and the shares 20 and 21 secured to the bottom bar and provided with teeth 25, substantially as described.

2. In a potato digger, the combination of two longitudinal bottom bars, two similar top bars, two bow-shaped braces connecting these two sets of bars, digger shares attached to the bottom bars and projecting inwardly toward each other, rearwardly projecting teeth attached to the shares, handles attached to the top bars and provided with supporting braces, and draw-bars 40 attached at their rear extremities to the top bars from which points of attachment they approach each other and terminate at their junction in an eye 35, substantially as described.

In testimony whereof I affix my signature in presence of two witnesses.

JEROME B. BLANCHARD.

Witnesses:
WM. MCCONNELL,
G. J. ROLLANDET.